Figure 1:
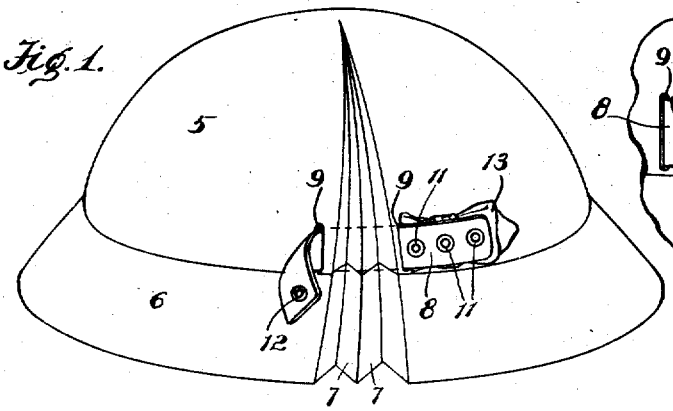

Aug. 7, 1928. P. A. FISCHER Re. 17,064

ADJUSTABLE HAT

Original Filed Nov. 25, 1922 2 Sheets-Sheet 1

Inventor
Philip A. Fischer
By his Attorney
Martin T. Fisher

Aug. 7, 1928. P. A. FISCHER Re. 17,064

ADJUSTABLE HAT.

Original Filed Nov. 25, 1922 2 Sheets-Sheet 2

Inventor
Philip A. Fischer
By his Attorney
Martin T. Fisher

Reissued Aug. 7, 1928.

Re. 17,064

UNITED STATES PATENT OFFICE.

PHILIP A. FISCHER, OF NEW YORK, N. Y., ASSIGNOR TO ADJUSTO HAT CORPORATION, A CORPORATION OF NEW YORK.

ADJUSTABLE HAT.

Original No. 1,663,124, dated March 20, 1928, Serial No. 603,175, filed November 25, 1922. Application for reissue filed June 11, 1928. Serial No. 284,630.

This invention is an adjustable hat, that is to say, a hat the head size of which may be varied so that it will comfortably fit any average sized head.

A hat with a variable head size presents several advantages. From the manufacturing point of view, it is difficult to predict just how many hats to make of a given size; from the retailers point of view, it is difficult to tell just how many hats of a given size should be laid in stock. These two problems are practically solved by a hat with a variable head size, because only one size need be manufactured or put in stock.

Again, from the manufacturer's point of view, a different set of patterns is required for each hat of a given size; with this invention, one pattern will suffice, whereby the manufacturing cost is very appreciably lowered.

From the point of view of the individual wearer, he can always make his hat to fit exactly the way he wants it to fit; he can make it fit tightly to prevent its blowing off; in case of stretching or shrinkage, suitable adjustment may be made to compensate for such changes.

The broad idea of headgear with adjustable head sizes is not a new one; I have myself taken out two Patents, No. 1,333,708, granted March 16, 1920, and No. 1,337,397, granted April 20, 1920, on caps with adjustable head sizes.

According to the present invention, the hat or cap is provided with a plurality of permanently formed pleats, which extend from the inner part of the hat or cap downwardly and outwardly to the outer edge of the brim. These pleats are preferably what is known as accordion pleats, and are formed in the hat or cap in suitable apparatus, such as appropriately shaped dies, with heat and pressure, so that the material is very strongly and permanently creased. That part subjected to the pleating may be specially treated to aid it in holding the pleated form.

In the preferred form of the invention, the pleats extend from substantially the crown of the hat downwardly and outwardly, through the brim, gradually increasing in size meanwhile.

Means engageable with the hat on opposite sides of the pleats are provided for holding the pleats in any desired state of contraction, or expansion, according to the head size desired. In one form of the invention, a strap is used which engages with the hat through two slots and is then bent around the pleats; the ends of the strap are adjustably secured together. In another form of the invention, a band, preferably the hat band itself, is used, which engages with the hat by being sewed thereto as usual; the two ends of the hat band are adjustably secured together.

The invention will be described more specifically by reference to the accompanying drawings, showing several ways of carrying it out. It should be understood, however, that these drawings are purely illustrative, and that the broader features of the invention may carried out in other ways.

Figure 3:
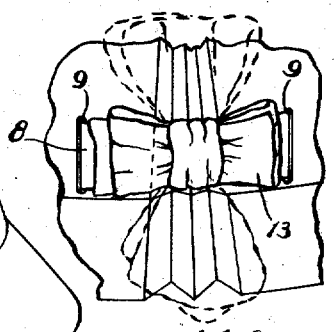
Figure 4:
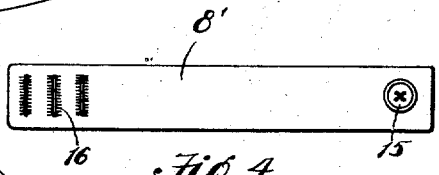
Figure 2:
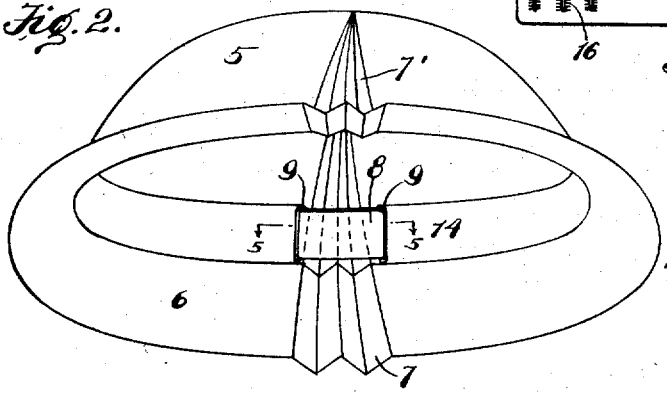
Figure 5:
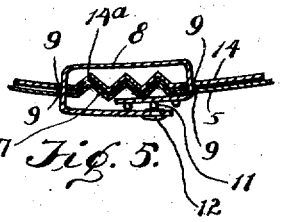
Figure 10:
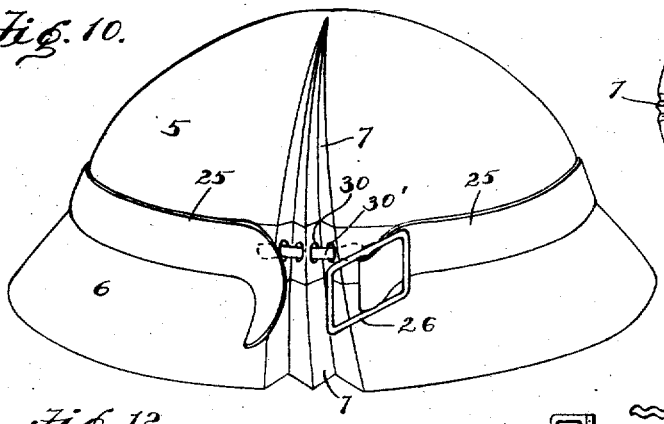
Figure 20:
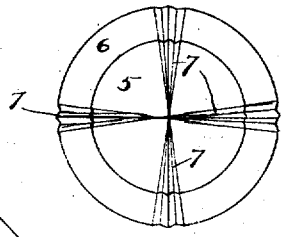
Figure 11:
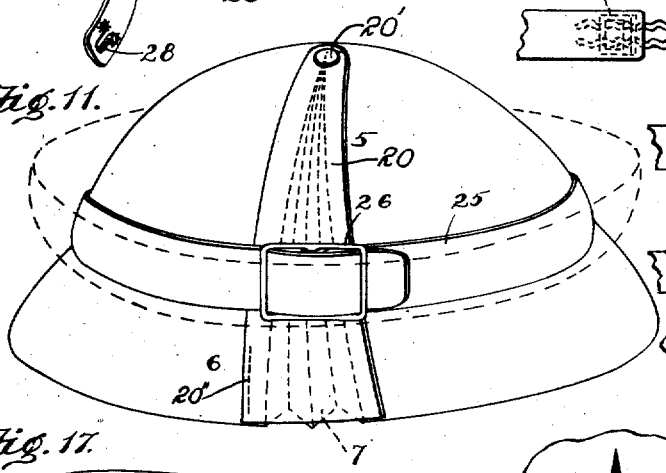
Figure 17:
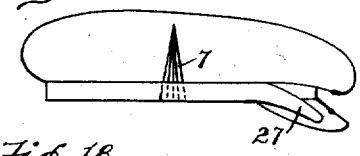
Figure 19:
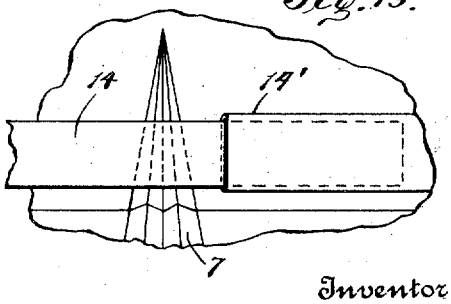
Figure 18:
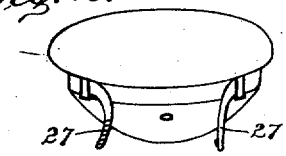

Referring now to these drawings:

Fig. 1 is a side view of a hat according to this invention; Fig. 2 is a view of the hat from below; Fig. 3 is a view of an ornamental device as applied; Fig. 4 shows a modified form of adjusting strap; Fig. 5 is a section on the line 5—5 of Fig. 2; Figs. 6, 7, 8 and 9 are detached views showing several ways of varying the effective length of the adjusting cord; Fig. 10 is a side view of a modified form of hat; Fig. 11 is a similar view, with the parts in different positions; Figs. 12, 13, 14, 15 and 16 show various means for adjustably securing the ends of the adjusting straps together; Figs. 17 and 18 are front and side views, respectively, showing the invention as applied to a cap; Fig. 19 shows a modification of the sweat band; and Fig. 20 is a diagrammatic top view of another modification.

Referring now to these drawings, similar reference characters will be used to indicate similar parts. The hat comprises a crown 5 and a brim 6; starting in the crown and extending downwardly and outwardly in the crown and out to the edge of the brim, is a plurality of permanently formed creases, pleats or corrugations 7, of the nature of accordion pleats. These pleats 7 gradually increase in size toward the edge of the brim. The pleats are pressed into the hat during manufacture by any desired sort of apparatus, with heat and pressure, preferably; the material of the hat may be specially treated so that it will permanently retain the creases.

In order to hold the pleats in any desired state of expansion or contraction, an adjusting strap 8 is used; this strap engages with the crown of the hat through two slots 9 on opposite sides of the pleats 7, and its ends are adjustably secured together in any desired manner, such as the well-known ball and socket fasteners, one end of the strap being provided with the socket elements 11 and the other end with the ball element 12. An ornamental device 13, arranged vertically or horizontally, as desired, is carried by the strap 8.

The sweat band 14 is cut away adjacent the pleats, as shown in Fig. 2; however, the strap 8 is between the pleats and the head of the wearer, so that the edges of the pleats will not be uncomfortable against the head of the wearer.

As shown in Fig. 2, another set of pleats 7′ may be put in the other side of the hat, and with such pleats another adjusting strap may or may not be used, as desired.

Fig. 4 shows a modified form of the adjusting strap. The strap, indicated at 8′, performs the functions of the strap 8, and has its ends adjustably secured together by the button 15 and buttonholes 16.

Fig. 5 shows a modification of the sweat band, where this band is creased or pleated in the same manner as are the pleats 7. This pleated part of the sweat band is indicated at 14ª, and the two sets of pleats fit together, as shown. These two sets of creases may be simultaneously pressed into the sweat band and into the body of the hat. With this construction, as shown in Fig. 5, the slots 9 pass through both the hat and the sweat band, and the strap 8 is between the pleats 7 and 14ª, and the head of the wearer.

Figure 6:
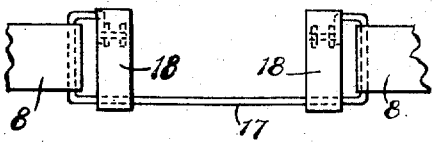
Figure 8:
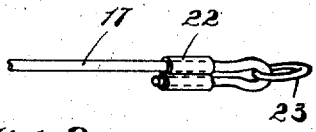
Figure 7:
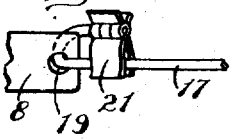

In Fig. 6, the two ends of the strap 8 are looped, and through the loops is passed a cord 17, on the ends of which are spring clamps 18, whereby the length of the cord 17 may be varied, for varying the effective length of the strap 8. Fig. 7 shows a slightly different device for the same purpose, the cord 17 passing through a hole 19 in the strap and having a spring clamp 21 on both ends. The other end is not shown. Fig. 8 shows still another way of varying the length of the cord 17. The cord passes through a friction slide piece 22, through an eye 23, which is attached to an end of the strap 8 and back to the piece 22 to which it is attached.

Figure 9:
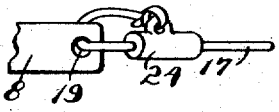

Fig. 9 shows a further method for varying the effective length of the cord 17. In this modification, the cord is passed through a hole 19 in the member 8 and is then tied to a tubular slide piece 24 through which the cord 17 is threaded with a friction fit, the friction being sufficient to keep it in the desired position on the cord.

In the modified form of hat shown in Fig. 10, the adjusting strap is the hat band itself, indicated at 25. It of course engages with the hat on opposite sides of the pleats by being sewed thereto. The ends of the hat band are adjustably secured together in any desired manner. For example, a buckle 26 may be carried by one end of the band, which adjustably engages with the other end of the band, as shown in Fig. 11. The buckle 26 preferably overlies the pleats 7. As indicated in Fig. 11, the hat brim may be turned up or down, as desired. Furthermore, the pleats may be concealed in any manner, as by the ornamental piece 20, attached to the hat so as to permit the expansion and contraction of the pleats underneath it; as shown, the covering piece 20 is attached to the hat at two points, as by the ornamental button 20′ and by stitches 20″. The covering piece may cover part or all of the pleats 7, as desired.

Referring to Fig. 19, in order to protect the head of the wearer, the ends of the sweat band 14 overlap; these ends may simply overlap, but preferably one end 14′ of the sweat band is formed like a pocket, into and out of which the other end of the band 14 slides readily.

In order to keep the pleats 7 in proper relative position, so that they will fold and unfold readily, the pleats may be provided with a plurality of registering apertures 30; through these apertures passes a guide element 30′ of cloth or metal of sufficient stiffness properly to guide the pleats 7 as they fold and unfold.

Figs. 17 and 18 show the invention as applied to a cap; the pleats 7 extend well up the side of the cap, but not as far into the crown as with the hat. Adjusting straps 27 extend from opposite sides of the cap toward each other, and have their ends adjustably secured together in any desired manner.

Figs. 12–16, inclusive, show various ways for adjustably securing together the ends of the strap 8, the band 25, or the straps 27, as the case may be.

Figure 13:
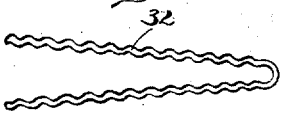
Figure 12:
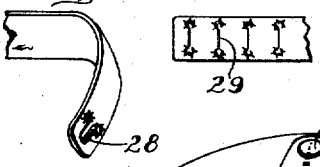
Figure 14:
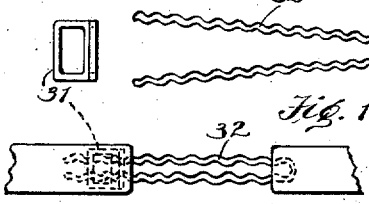
Figure 15:
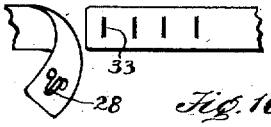
Figure 16:
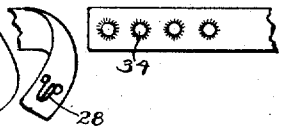

In Fig. 12, one strap end has a hook 28 adapted to hook over the elements 29 on the other end of the strap; in Figs. 13 and 14, one strap end carries an apertured element 31 into which the corrugated spring element 32 carried by the other strap end, engages. The element 32 is of spring steel bent so that it tends to spring outwardly. In Fig. 15, the hook 28 engages with the buttonholes 33, and in Fig. 16, with eyelets 34.

The hat may have any desired number of sets of pleats 7; four sets are diagrammatically indicated in Fig. 20. While the pleats preferably extend all the way to the edge of the brim, they may, if desired, be not extended that far, thus leaving the outer edge of the brim intact.

This disclosure is only illustrative, and accordingly it should be understood that the invention is not limited to the specific details here shown. Instead of a plurality of pleats, a single pleat could be used, and the claims are to be interpreted accordingly.

I claim as my invention:—

1. An adjustable hat of generally conventional design, having a few closely grouped, pleats in one side thereof, the pleats beginning in the crown of the hat and extending downwardly and outwardly into the brim of the hat the rest of the hat having the usual smooth outer surface, the pleats gradually widening toward the lower or brim end thereof, means engageable with the hat on opposite sides of the pleats for holding the pleats in various positions for varying the head size of the hat, and a covering member for concealing the pleats.

2. An adjustable hat of generally conventional design, one side of the hat having a few closely grouped, pleats therein, while the rest of the hat has the usual smooth outer surface, the pleats beginning in the crown of the hat and extending downwardly and outwardly into the brim of the hat, and means for adjustably holding the pleats in an expanded or contracted state for varying the head size of the hat.

3. An adjustable hat of generally conventional design, having a few closely grouped, pleats in one side thereof, the rest of the hat having the usual smooth exterior surface, a hat band, means for adjustably securing the ends of the hat band together for variably positioning the pleats for varying the head size of the hat and a covering member for concealing the pleats.

4. An adjustable hat of generally conventional design, having pleats extending from the crown downwardly and outwardly to the edge of the brim the rest of the hat having the usual smooth outer surface, a hat band, and means for adjustably securing the ends of the hat band together for variably positioning the pleats for varying the head size of the hat.

5. An adjustable hat of generally conventional design, one side of the hat having a few closely grouped pleats therein adapted to be folded and unfolded for varying the head size of the hat while the rest of the hat has the usual unpleated outer surface, the pleats beginning in the crown of the hat and extending downwardly to the lower edge of the hat, said pleats being formed with apertures located near the lower end of the crown, and a guide element passing loosely through said apertures and extending to and terminating slightly beyond, the outer pleats of the group to guide the pleats as they fold and unfold.

6. An adjustable hat of generally conventional design, one side of the hat having a few closely grouped pleats therein adapted to be folded and unfolded for varying the head size of the hat while the rest of the hat has the usual unpleated outer surface, the pleats beginning in the crown of the hat and extending downwardly to the lower edge of the hat, said pleats being formed with apertures located a short distance above the lower edge of the hat crown, a guide element passing through said apertures extending to and terminating slightly beyond, the outer pleats of the group to guide the pleats as they fold and unfold, and adjustable means to limit the expansion of the hat to a plurality of different head sizes.

7. An adjustable hat of generally conventional design, one side of the hat having a few closely grouped pleats therein adapted to be folded and unfolded for varying the head size of the hat while the rest of the hat has the usual unpleated outer surface, the pleats beginning in the crown of the hat and extending downwardly to the lower edge of the hat, said pleats being formed with apertures located near the lower edge of the hat crown, a guide element passing through said apertures extending to and terminating slightly beyond, the outer pleats of the group to guide the pleats as they fold and unfold, and adjustable means to limit the expansion of the hat to a plurality of different head sizes said means covering the guide element.

8. An adjustable hat of generally conventional design, one side of the hat having a few closely grouped pleats therein adapted to be folded and unfolded for varying the head size of the hat while the rest of the hat has the usual unpleated outer surface, the pleats beginning in the crown of the hat and extending downwardly to the lower edge of the hat, said pleats being formed with apertures located near the lower edge of the hat crown, a guide element passing loosely through said apertures extending to and terminating slightly beyond, the outer pleats of the group to guide the pleats as they fold and unfold, and exterior covering means carried by the hat to cover said guide element.

9. An adjustable hat of generally conventional design, one side of the hat having a few closely grouped pleats therein adapted to be folded and unfolded for varying the head size of the hat while the rest of the hat has the usual unpleated outer surface, the pleats beginning in the crown of the hat and extending downwardly to the lower edge of the hat, said pleats being formed with apertures extending to and terminating slightly beyond, the outer pleats of the group, a guide element passing loosely through said apertures to guide the pleats as they fold and unfold, and a band extending around the exterior of the hat and adapted to cover said guide element.

10. An adjustable hat of generally conventional design, one side of the hat having a few closely grouped pleats therein adapted to be folded and unfolded for varying the head size of the hat while the rest of the hat has the usual unpleated outer surface, the pleats beginning in the crown of the hat and extending downwardly to the lower edge of the hat, said pleats being formed with apertures, a guide element passing loosely through said apertures extending to and terminating slightly beyond, the outer pleats of the group to guide the pleats as they fold and unfold, and a band extending around the exterior of the hat, adjustable to different lengths for limiting the expansion of the hat to different sizes and adapted to cover said guide element.

11. An adjustable hat of generally conventional design, one side of the hat having a few closely grouped pleats therein adapted to be folded and unfolded for varying the head size of the hat while the rest of the hat has the usual unpleated outer surface, the pleats beginning in the crown of the hat and extending downwardly to the lower edge of the hat, said pleats being formed with apertures in their opposed folds, a guide element in the form of an elongated strip extending loosely through said apertures transversely of the pleats to guide the pleats as they fold and unfold, and exterior covering means carried by the hat to cover said guide element.

In testimony whereof I hereunto affix my signature.

PHILIP A. FISCHER.